3,740,424
BORATE COMPLEX OF POLYENE MACROLIDE
ANTIBIOTICS
John Vandeputte, Milltown, N.J., assignor to E. R.
Squibb & Sons, Inc., New York, N.Y.
No Drawing. Continuation-in-part of abandoned application Ser. No. 634,819, May 1, 1967. This application Feb. 24, 1970, Ser. No. 13,772
Int. Cl. A61k 21/00
U.S. Cl. 424—181     8 Claims

ABSTRACT OF THE DISCLOSURE

This invention relates to a borate complex of polyene macrolide compounds. The borate complex is formed by the interaction of a polyene macrolide compound and a borate salt in a medium such as methanol. The borate complex retains the activity of the antibiotic and has the particular advantage of being soluble in water and is stable both in the dry form and in solution.

RELATED APPLICATION

This application is a continuation-in-part of copending U.S. patent application Ser. No. 634,819 filed May 1, 1967 now abandoned.

BACKGROUND OF THE INVENTION

Polyene macrolide compounds, having antifungal properties, constitute a class of substances that have been produced, as antibiotics, by cultivation of various organisms and by extraction of the substance from the culture. It has been demonstrated that these polyene macrolide compounds are essentially high molecular weight macrocyclic lactones, better known as macrolides, and that they each possess a chromophore of from 4 to 7 conjugated double bonds. In addition to the large lactone nucleus, or linked to it, the compounds include other characteristic or significant groups, in all cases including one amino sugar. While characteristic chemical differences are known to distinguish various members of the group from each other, they have a basic structural similarity of the nature stated, i.e. in comprising a large lactone nucleus, and in including, presumably as part of the nucleus, a system of conjugated double bonds, and in having one or more amino groups, including an amino sugar moiety. Thus they can be described as comprising an amino sugar glycoside of a macrolide nucleus. A number of such compounds are known, such as amphotericin A, amphotericin B, nystatin, candicidin, pimaricin, trichomycin and perimycin. A general discussion of macrolide antibiotics is found in Kirk-Othmer, Encyclopedia of Chemical Technology, 2nd ed., vol. 12, pp. 632 et seq., while a general discussion of polyene antibiotics is to be found in the same work, vol. 16, pp. 133 et seq.

While the polyene antifungal compounds have been recognized as valuable, particularly in their powerful antifungal properties and in the apparent inability of fungus organisms to develop readily any strains or forms that are resistant to these polyenes, their use has been limited by lack of adequate water solubility in forms of the substance which are otherwise stable and appropriate.

OBJECTS OF THE INVENTION

It is, accordingly, an object of the present invention to provides a more soluble form of a polyene macrolide compound. Another object is to provide a stable form of a polyene macrolide compound. A further object is to provide a method for preparing these new forms of a polyene macrolide compound. These and other objects of the present invention will be apparent from the following description.

DETAILED DESCRIPTION

This invention relates to a borate complex of a polyene macrolide compound. This complex is formed by slurrying a polyene macrolide compound and a borate obtained from a water-soluble alkali metal, ammonium or amine salt of boric acid in an alcoholic solvent. Preferably, the borate salt is employed in excess molar amount. The borate complex which forms is soluble in the alcohol and may be precipitated with acetone. The borate complex is essentially equimolar, containing about 1 mole of tetraborate per mole of polyene macrolide compound.

The borate salt may be formed from such metals as lithium, sodium, potassium, rubidium or cesium, from ammonia, or from amines such as alkylamines or hydroxyalkylamines, such as ethylamine, diethylamine, triethylamine or triethanolamine. The alcohol may be methanol, ethanol, propanol, i-propanol, t-butanol or mixtures thereof, or mixtures of an alcohol with another solvent, e.g. methanol-dimethylsulfoxide (DMSO) methanol-dimethylformamide (DMF), or methanol-N-methyl-2-pyrrolidone. Methanol is preferred.

The borate complex of the polyene macrolide compound retains the antifungal activity, is stable in the dry form and is soluble in water. At a concentration of 10 mg./ml., the pH in water is about 9.0–9.2. The aqueous solution retains activity for days. It is also soluble in methanol, other aqueous alcohols and aqueous acetone.

A particular advantage of the solubility in water of the borate complex of the polyene macrolide compound, in addition to being able to prepare water solutions for use as such and in procesisng, is that it permits the use of the substance to control fungal growths in the digestive tract of fowl by supplying it in the drinking water, e.g., at a concentration of about 30 to 275 mg. per liter.

The following examples illustrate the present invention without, however, limiting the same thereto.

EXAMPLE 1

One hundred fifty gm. of crystalline nystatin is slurried in 1500 ml. of methanol. Sixty gm. of sodium borate ($Na_2B_4O_7 \cdot 10H_2O$) are added and the mixture is agitated for ½ hour to allow for formation of the complex which is soluble in methanol. Filter aid (Hyflo) is added and the mixture is filtered. The filter cake is washed with methanol and the combined filtrate and cake wash are concentrated under vacuum to about 35% of its original volume. This concentrate is poured slowly into 5 volumes of acetone which is vigorously agitated. After the addition is complete, the mixture is agitated for an additional ½ hour. The precipitated borate complex of nystatin is then removed by filtration. It is washed thoroughly with acetone and dried at 30° C. under vacuum. More than 90% of the nystatin is recovered as the amorphous yellow-tan borate complex.

The ultraviolet spectrum of the complex in methanol shows an $$E_1^1 \text{ at } 304 \text{ m}\mu = 608$$

The complex has a solubility in water of from about 50 to about 100 mg./ml.

EXAMPLE 2

One hundred g. of amphotericin B activity is added slowly to 1250 ml. of a 70% DMSO/30% methanol (v./v.) solution. To this is added 40 g. of $Na_2B_4O_7 \cdot 10H_2O$, the mixture agitated for one hour to allow for formation of the complex and filtered.

The rich filtrate, including the wash, is added to 5 volumes of acetone over a 5–10 minute period using mild agitation. The agitation is continued for one hour and the mixture filtered. The cake is thoroughly washed with acetone and dried under vacuum at temperatures <30° C. The dried product is hard and rather dense and must be ground and screened through an 80 or 100 mesh screen to obtain a free flowing uniform powder.

The recovery of amphotericin B is practically quantitative as the borate complex.

The ultraviolet spectrum of the complex in methanol shows an $$E_1^1 \text{ at } 405 \text{ m}\mu = 820$$

The complex has a solubility in water of from about 50 to about 100 mg./ml.

The pH of a 3% aqueous solution is 9–9.2 and the solution is stable for days with respect to the reprecipitation of amphotericin B.

EXAMPLE 3

The procedure of Example 2 is repeated substituting 100 g. of candicidin activity for the amphotericin B. The borate complex is obtained as an amorphous powder. Its infrared spectrum is similar to that of the borate complex of amphotericin. The pH of a 3% aqueous solution is between 9–9.2.

What is claimed is:

1. A water soluble complex of a borate salt and a polyene macrolide antibotic produced by slurrying in an alcoholic solvent wherein the alcohol has up to 4 carbon atoms a water soluble alkali metal, ammonium, alkylamine or hydroxyalkylamine salt of boric acid and a polyene macrolide compound having a chromophore of from 4 to 7 double bonds selected from the group consisting of amphotericin A, amphotericin B, nystatin, candicidin, pimaricin, trichomycin and perimycin, the complex containing essentially equimolar amounts of the borate and polyene macrolide compound.

2. A complex according to claim 1 wherein the polyene macrolide compound is amphotericin A, amphotericin B, nystatin or candicidin.

3. A complex according to claim 1 wherein the polyene macrolide compound is nystatin.

4. A complex according to claim 1 wherein the polyene macrolide compound is candicidin.

5. A method of preparing a water soluble complex of a borate salt and a polyene macrolide antibiotic according to claim 1 which comprises mixing a polyene macrolide compound selected from the group consisting of amphotericin A, amphotericin B, nystatin, candicidin, pimaricin, trichomycin and perimycin with a borate obtained from an alkali metal, ammonium alkylamine or hydroxyalkylamine salt of boric acid, the mixing taking place in the presence of an alcohol having up to 4 carbon atoms, and agitating the mixture.

6. A method of recovering the complex prepared according to claim 5 which comprises precipitating the complex by the addition of acetone.

7. A complex according to claim 1 wherein the polygene macrolide compound is amphotericin B.

8. A complex according to claim 1 which is precipitated by the addition of acetone.

References Cited

UNITED STATES PATENTS

| | | | |
|---|---|---|---|
| 2,786,781 | 3/1957 | Vandeputte et al. | 424—120 |
| 3,244,590 | 4/1966 | Schaffner et al. | 424—181 |
| 2,603,584 | 7/1952 | Pidacks et al. | 424—185 |
| 2,564,505 | 8/1951 | Ruskin | 424—185 |

SAM ROSEN, Primary Examiner

U.S. Cl. X.R.

424—185